(12) United States Patent
Nie

(10) Patent No.: US 11,729,520 B2
(45) Date of Patent: *Aug. 15, 2023

(54) SENSOR LAYOUT FOR AUTONOMOUS VEHICLES

(71) Applicant: TUSIMPLE, INC., San Diego, CA (US)

(72) Inventor: Lei Nie, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/374,112

(22) Filed: Jul. 13, 2021

(65) Prior Publication Data

US 2021/0344849 A1 Nov. 4, 2021

Related U.S. Application Data

(63) Continuation of application No. 16/572,155, filed on Sep. 16, 2019, now Pat. No. 11,076,109.

(51) Int. Cl.
*G06T 7/55* (2017.01)
*H04N 23/90* (2023.01)
(Continued)

(52) U.S. Cl.
CPC ........... *H04N 23/90* (2023.01); *G01S 13/865* (2013.01); *G01S 13/867* (2013.01); *G01S 13/931* (2013.01); *G01S 19/49* (2013.01); *H04N 23/54* (2023.01)

(58) Field of Classification Search
CPC ...... G01S 13/87; G01S 13/426; G01S 13/865; G01S 13/867; G01S 13/931; G01S 19/49; G01S 17/42; G01S 17/58; G01S 17/86; G01S 17/87; G01S 17/931; G01S 2013/9316; G01S 2013/9318; G01S 2013/93185; G01S 2013/93271;
(Continued)

(56) References Cited

U.S. PATENT DOCUMENTS 6,429,420 B1 * 8/2002 Babst .................... G01S 17/931
250/221
9,103,671 B1 8/2015 Breed et al.
(Continued)

OTHER PUBLICATIONS

Extended European Search Report for European Patent Application No. 20195935.0, dated Feb. 5, 2021.

*Primary Examiner* — Howard D Brown, Jr.
(74) *Attorney, Agent, or Firm* — Paul Liu; Glenn Theodore Mathews; Perkins Coie, LLP

(57) ABSTRACT

Disclosed are devices and systems for an optimized sensor layout for an autonomous or semi-autonomous vehicle. In one aspect, the system includes a vehicle capable of semi-autonomous or autonomous operation. A plurality of forward-facing cameras is coupled to the vehicle and configured to have a field of view in front of the vehicle. At least three forward-facing cameras of the plurality of forward-facing cameras have different focal lengths. A right-side camera is coupled to the right side of the vehicle, the right-side camera configured to have a field of view to the right of the vehicle. A left-side camera is coupled to the left side of the vehicle, the left-side camera is configured to have a field of view to the left of the vehicle.

20 Claims, 7 Drawing Sheets

(51) Int. Cl.
*G01S 13/86* (2006.01)
*G01S 13/931* (2020.01)
*G01S 19/49* (2010.01)
*H04N 23/54* (2023.01)

(58) Field of Classification Search
CPC . G01S 2013/93272; G01S 2013/93273; G01S 2013/93274; G01S 2013/93277; G01S 13/58; H04W 4/40; H04W 84/18; B60R 1/00; B60R 16/02; H04N 5/232; H04N 5/247; H04N 5/2253

See application file for complete search history.

(56) References Cited

U.S. PATENT DOCUMENTS

| | | | |
|---|---|---|---|
| 2018/0052463 A1* | 2/2018 | Mays | B60W 60/007 |
| 2018/0113209 A1 | 4/2018 | Campbell | |
| 2019/0129429 A1* | 5/2019 | Juelsgaard | G05D 1/0231 |
| 2019/0156134 A1† | 5/2019 | Krishnan | |
| 2019/0235519 A1 | 8/2019 | Carter et al. | |
| 2019/0244378 A1* | 8/2019 | Dong | H04N 13/00 |
| 2020/0172014 A1* | 6/2020 | Takhirov | B60R 1/002 |

\* cited by examiner
† cited by third party

SENSOR LAYOUT FOR AUTONOMOUS VEHICLES

CROSS REFERENCE TO RELATED APPLICATIONS

This patent document is a continuation of and claims priority to U.S. patent application Ser. No. 16/572,155, filed on Sep. 16, 2019. The entire contents of the before-mentioned patent application is incorporated by reference as part of the disclosure of this document.

TECHNICAL FIELD

This document relates to tools (systems, apparatuses, methodologies, computer program products, etc.) for semi-autonomous and autonomous control of vehicles, and more particularly, a sensor layout for optimizing sensor layout for autonomous vehicles.

BACKGROUND

In autonomous driving systems, the successful perception of the surrounding driving environment is crucial for making correct and safe decisions for a host vehicle. Multiple sensors are typically used to successfully perceive the surrounding environment utilizes. The sensors provide accurate, stable, and timely data to downstream algorithm modules. The layout and configuration of the sensors must balance providing this critical data to the algorithm modules without overwhelming the algorithm modules with excessive or redundant information.

Thus, an optimized sensor layout for autonomous vehicles is needed.

SUMMARY

Disclosed are devices and systems for an optimized sensor layout for an autonomous or semi-autonomous vehicle. In one aspect, the system includes a vehicle capable of semi-autonomous or autonomous operation. A plurality of forward-facing cameras is coupled to the vehicle and configured to have a field of view in front of the vehicle. At least three forward-facing cameras of the plurality of forward-facing cameras have different focal lengths. A right-side camera is coupled to the right side of the vehicle, and the right-side camera configured to have a field of view to the right of the vehicle. A left-side camera is coupled to a left side of the vehicle, and the left-side camera is configured to have a field of view to the left of the vehicle.

In another aspect, a system includes a tractor capable of semi-autonomous or autonomous operation, the tractor coupled to a semi-trailer. A plurality of forward-facing cameras is coupled to one of the tractor or the semi-trailer and are configured to have a field of view in front of one of the tractor or the semi-trailer. At least three forward-facing cameras of the plurality of forward-facing cameras have different focal lengths. A right-side camera is coupled to a right side of one of the tractor or the semi-trailer. The right-side camera is configured to have a field of view to the right of one of the tractor or the semi-trailer. A left-side camera is coupled to the left side of one of the tractor or the semi-trailer. The left-side camera configured to have a field of view to the left of one of the tractor or the semi-trailer.

The above and other aspects and features of the disclosed technology are described in greater detail in the drawings, the description and the claims.

BRIEF DESCRIPTION OF THE DRAWINGS

The various embodiments are illustrated by way of example, and not by way of limitation, in the figures of the accompanying drawings.

Identical reference numerals have been used, where possible, to designate identical elements that are common to the figures. It is contemplated that elements disclosed in one implementation may be beneficially utilized in other implementations without specific recitation.

DETAILED DESCRIPTION

Figure 1:
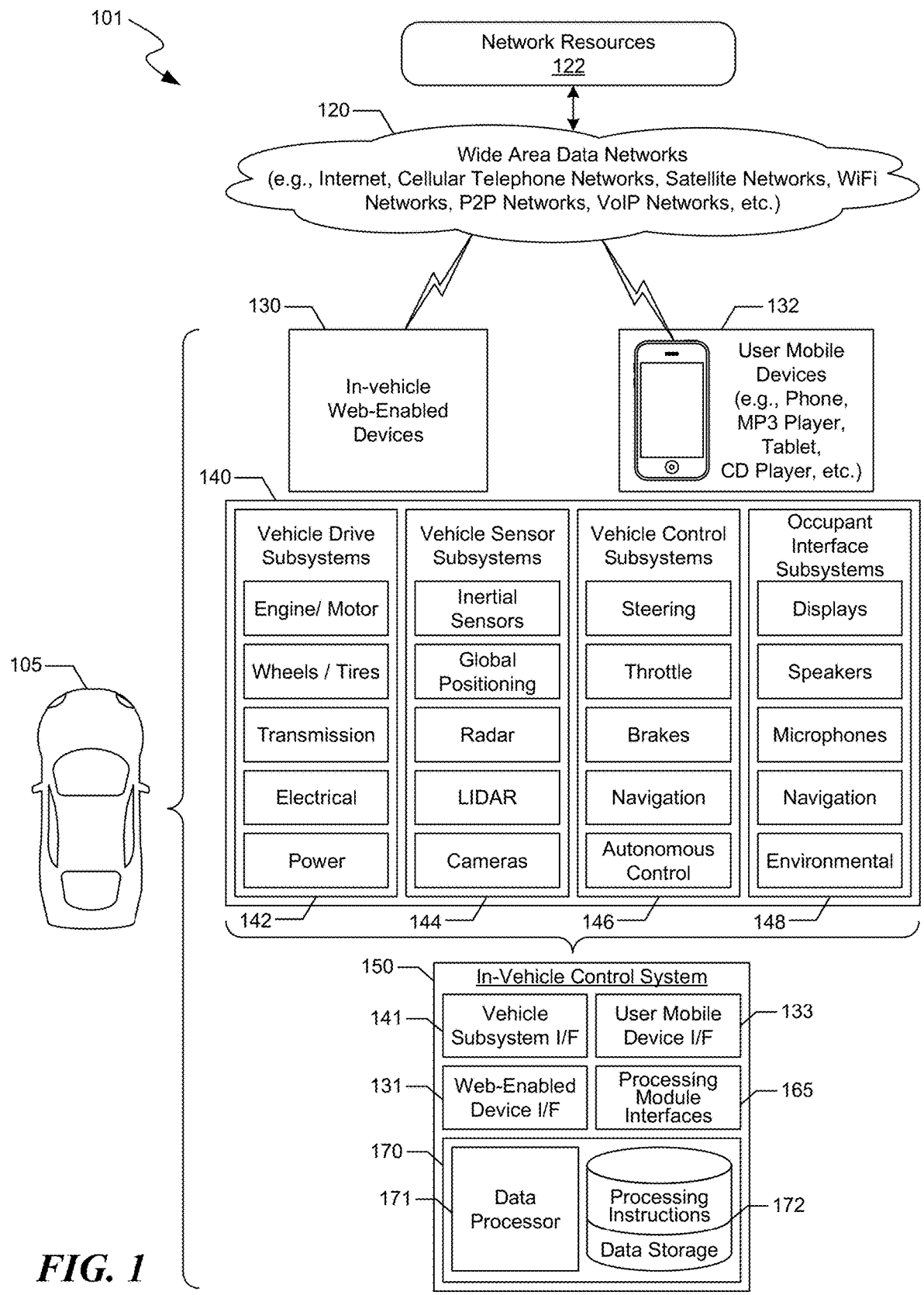
FIG. 1 illustrates a block diagram of an example ecosystem in which an optimized sensor layout of an example embodiment can be implemented.

In the following description, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

Autonomous vehicles currently face several technical limitations hindering their interaction and adaptability to the real world.

Current autonomous vehicle technology is often reactive—that is, decisions are based on a current condition or status. For instance, autonomous vehicles may be programmed to make an emergency stop upon detecting an object in the middle of the road. However, current autonomous vehicle technology has a limited capacity to determine the likelihood of being hit from behind or the probability of causing a highway pileup due to quick braking.

Furthermore, current technology does not know how to make real-world judgment calls. Various objects on the roadway require different judgments based on the context and current conditions. For instance, swerving to avoid a cardboard box causes unnecessary danger to the autonomous vehicle and other drivers. On the other hand, swerving is necessary to avoid hitting persons in the middle of the roadway. The judgment calls change upon the road conditions, the trajectory of other vehicles, the speed of the autonomous vehicle, and the speed and wheel direction of other vehicles.

Additionally, current technology is not suitable for an environment with other human drivers. Autonomous vehicles must be able to predict the behaviors of other drivers or pedestrians when reacting to changes in traffic patterns. One goal for acceptance of the autonomous vehicles in real life is to behave in a manner that allows proper interaction with other human drivers and vehicles. Human drivers often make decisions in traffic based on predictable human responses that are not necessarily conducive to machine rules. In other words, there is a technical problem with autonomous vehicles in that current autonomous driving vehicles behave too much like a machine. This behavior potentially causes accidents because other drivers do not anticipate certain acts performed by the autonomous vehicle.

The present document provides technical solutions to the above problems, among other solutions. For example, an optimized sensor layout for autonomous vehicles is described to accurately perceive the environment, pedestrians, other vehicles and drivers, and debris. An optimized sensor layout allows the host vehicle and associated algorithm modules to address these potential scenarios and respond accordingly. Thus, the disclosure provides an optimized sensor layout as a solution to the above problems, among other solutions.

Referring now to FIG. 1, a block diagram illustrates an exemplary ecosystem 101 in which an in-vehicle control system 150 of an example embodiment can be implemented. These components are described in more detail below. Ecosystem 101 includes a variety of systems and components that can generate and/or deliver one or more sources of information/data and related services to the in-vehicle control system 150, which can be installed in the vehicle 105. For example, a camera installed in the vehicle 105, as one of the devices of vehicle subsystems 140, can generate image and timing data that can be received by the in-vehicle control system 150. The in-vehicle control system 150 executing therein can receive image and timing data input. The autonomous vehicle control subsystem, for example, can use the real-time extracted object features to safely and efficiently navigate and control the vehicle 105 through a real-world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 for processing data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171. In various example embodiments, a plurality of processing modules can be provided for execution by data processor 171. Software can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, Wi-Fi network, peer-to-peer network, Voice over IP (VoIP) network, etc. One or more of these networks 120 can be used to connect a user or client system with network resources 122, such as web sites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing data input or data input analysis. Antennas can serve to connect the in-vehicle control system 150 and the auditory assistant module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, Wi-Fi networks, peer-to-peer networks, Voice over IP (VoIP) networks, and the like are also well-known. Thus, as described in more detail below, the in-vehicle control system 150 and the auditory assistant module 200 can receive web-based data or content via an in-vehicle web-enabled device interface 131, which can be used to connect with the in-vehicle web-enabled device 130 and network 120. In this manner, the in-vehicle control system 150 can support a variety of network-connectable in-vehicle devices and systems from within a vehicle 105.

As shown in FIG. 1, the in-vehicle control system 150 can also receive data and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, and content for the in-vehicle control system 150. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, Wi-Fi triangulation, or other geo-location sensors or components in the mobile device, which can be used to determine the real-time geo-location of the user (via the mobile device) at any moment in time. In any case, the in-vehicle control system 150 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction. The vehicle 105 may include a tractor unit and one or more semi-trailers to carry freight. A semi-trailer may attach to the tractor with a coupling such that the tractor hauls the semi-trailer. The tractor unit may be, for example, cab of a truck or may be a vehicle with a driver's cabin plus an attached storage area in the back.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the auditory assistant module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the auditory assistant module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the auditory assistant module 200, the GPS transceiver, the RADAR, the LIDAR, the cameras, and other vehicle subsystems to determine the driving path or trajectory for the vehicle 105. The vehicle control subsystem 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short-range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer-readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control subsystem 146 in order to control the steering unit to avoid an obstacle detected by the vehicle sensor subsystem 144 and the auditory assistant module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the in-vehicle control system 150 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 can be implemented as in-vehicle components of vehicle 105. In various example embodiments, the in-vehicle control system 150 can be implemented as integrated components or as separate components. In an example embodiment, the software components of the in-vehicle control system 150 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System for Optimizing Sensor Layout for Autonomous Vehicles

Figure 2:
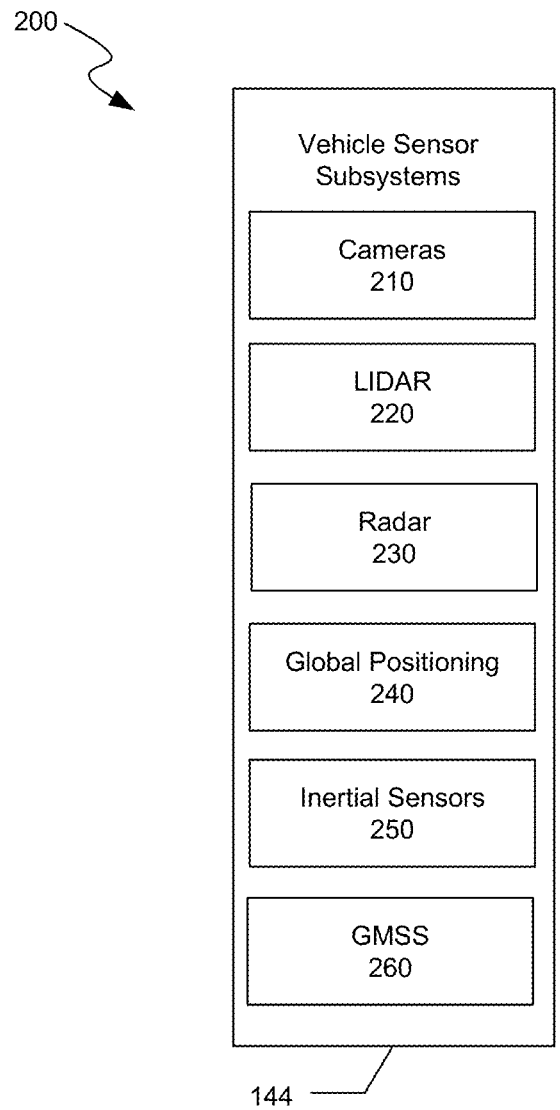
FIG. 2 shows a block diagram of a vehicle sensor subsystem in which an optimized sensor layout can be implemented in an example embodiment.

FIG. 2 shows a block diagram of a vehicle sensor subsystem in which an optimized sensor layout can be implemented in an example embodiment. The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices.

The vehicle 105 may include cameras 210. The cameras 210 may be configured to detect objects, road conditions, traffic signs, traffic signals, weather conditions, and other information relevant to the trajectory of the vehicle. The cameras 210 may be coupled to the vehicle using nails, screws, tapes, adhesives, welding, soldering, bolts, or similar materials. In some embodiments, the cameras 210 may be coupled to a rack along the top or bottom of the tractor. The cameras 210 may be coupled to the sides or the front of the truck. The cameras 210 may be coupled on top of or to the side of the engine compartment of the truck. The cameras 210 may be attached to the front grill, fenders, or mirrors of the truck. The cameras 210 may be coupled to any exterior portion of the cabin. The cameras 210 may be coupled to a rack along the top, sides, or bottom of the semi-trailer.

The vehicle 105 may include a plurality of forward-facing cameras coupled to the vehicle 105 oriented towards the front of the vehicle 105. The forward-facing cameras may be positioned towards the front of the vehicle 105. In at least one implementation, the forward-facing cameras may be positioned toward the front of the vehicle 105, semi-trailer, or tractor. The forward-facing cameras may be configured to have a field of view in front of the vehicle 105, semi-trailer, or tractor. The forward-facing cameras may be attached to a roof rack along the top side of the semi-trailer or tractor. The forward-facing cameras may be arranged along the edge of the top of the tractor or semi-trailer.

In at least one embodiment, the vehicle 105 includes at least one backward-facing camera coupled the vehicle 105 and facing towards the back of the vehicle 105. The at least one backward-facing camera may be positioned towards the back of the vehicle 105, semi-trailer, or tractor. The backward-facing camera may be configured to have a field of view behind the vehicle. The at least one backward-facing camera may be attached to a roof rack along the top side of the semi-trailer or tractor. The at least one backward-facing camera may be arranged along the edge of the top of the vehicle 105, tractor, or semi-trailer.

The vehicle includes at least one right-side camera coupled to the vehicle 105 and facing towards the right of the vehicle 105. The vehicle includes 105 at least one left-side camera coupled to the vehicle 105 and oriented towards the left of the vehicle 105. In some embodiments, a right-side camera may be coupled to the right side of one of the tractor or the semi-trailer, the right-side camera facing towards the right of one of the tractor or the semi-trailer. The right-side camera may be configured to have a field of view to the right of the vehicle 105. In some embodiments, a left-side camera may be coupled to a left side of one of the tractor or the semi-trailer, the left-side camera facing towards the left of one of the tractor or the semi-trailer. The left-side camera may be configured to have a field of view to the left of the vehicle 105.

The at least one left-side camera and the at least one right-side camera may be considered side-facing cameras. The side-facing cameras may be positioned towards the side of the vehicle 105, the tractor, or semi-trailer. In at least one implementation, the side-facing cameras may be positioned toward the side of the semi-trailer, tractor, or vehicle 105. The side-facing cameras may be attached to a roof rack along the top side of the semi-trailer or tractor. The side-facing cameras may be arranged along the edge of the top of the vehicle 105, tractor, or semi-trailer.

A camera 210 may have a different focal length for detecting objects at different distances. The different focal lengths provide data at different fields of vision. A lower focal length may result in a greater field of vision. In some implementations, a focal length of 6 mm may result in a horizontal field of view of 60 degrees. In other implementations, a camera 210 having a focal length of 25 mm may result in a horizontal field of view of 15.4 degrees. In still other implementations, a camera 210 having a focal length of 12 mm may result in a horizontal field of view of 32.8 degrees. A lower focal length may result in a larger perception range. In some implementations, a focal length of 6 mm may result in a perception range of 350 meters. In other implementations, a camera 210 having a focal length of 25 mm may result in a perception range of 1000 meters. In still other implementations, a camera 210 having a focal length of 12 mm may result in a perception range of 500 meters. In at least one embodiment, a plurality of forward-facing cameras may be coupled to the vehicle. At least three forward-facing cameras of the plurality of forward-facing cameras may have different focal lengths. In at least one embodiment, a plurality of forward-facing cameras coupled to one of the tractor or the semi-trailer. At least three forward-facing cameras of the plurality of forward-facing cameras may have different focal lengths.

According to some embodiments, a first forward-facing camera of the plurality of forward-facing cameras may have a focal length of 15 mm or less, a second forward-facing camera of the plurality of forward-facing cameras may have a focal length of 8-36 mm, and a third forward-facing camera of the plurality of forward-facing cameras may have a focal length of at least 25 mm. In other embodiments, a first forward-facing camera of the plurality of forward-facing cameras may have a focal length of 6 mm, a second forward-facing camera of the plurality of forward-facing cameras may have a focal length of 12 mm, and a third forward-facing camera of the plurality of forward-facing cameras may have a focal length of 25 mm.

Each forward-facing camera may have a different perception range. According to some implementations, a first forward-facing camera of the plurality of forward-facing cameras has a perception range of about 250 meters, a second forward-facing camera of the plurality of forward-facing cameras has a perception range of about 500 meters, and a third forward-facing camera of the plurality of forward-facing cameras of a perception range of about 1000 meters.

In some embodiments, the cameras are configured to have a range of vision at or near 360 degrees around the vehicle. For example, each the plurality of forward-facing cameras, the right-side camera, and the left-side camera are configured to have a range of vision at or near 360 degrees around the vehicle. In some implementations, the plurality of forward-facing cameras, the right-side camera, and the left-side camera are configured to have a range of vision at or near 360 degrees around the tractor and the semi-trailer. In at least one embodiment, the forward-facing cameras, the right-side camera, and the left-side camera are configured to have a range of vision at or near 360 degrees around the tractor and the semi-trailer.

In at least one embodiment, the vehicle 105 includes at least one backward-facing camera coupled the vehicle 105 and facing towards the back of the vehicle 105. The at least one backward-facing cameras may be positioned towards the back of the vehicle 105, semi-trailer, or tractor. The at least one backward-facing cameras may be attached to a roof rack along the top side of the semi-trailer or tractor. The at least one backward-facing cameras may be arranged along the edge of the top of the vehicle 105, tractor, or semi-trailer. In some embodiments, the backward facing cameras may be configured to provide a 360-degree field of vision (FOV) view. Alternatively, in some embodiments, the backward facing camera may have a middle range camera lens—e.g., 12 mm or smaller in focal length. This lens provides a view that is wide enough to cover critical area behind a semi-trailer. At the same time, the lens will provide a view that is narrow enough to not simply produce duplicative information that several other sensors and cameras cover. Furthermore, a 12 mm lens may be obtained "off the shelf" and without needing a custom lens fabrication. In one advantageous aspect, this focal length will provide a nearly complete view of the backside of the truck without generating additional overlapping visual information that overlaps with other camera angles and generates additional image data for analysis by on-board computers, which tends to expend power and computational resources. As further described in the present document, radars and other sensors may be used to provide a 360 degree coverage around the vehicle.

The sensor layout may include at least five forward-facing cameras, two backward-facing cameras, and one right-side camera facing to the right side, and one left-side camera facing to the left side according to some embodiments. Three of the forward-facing cameras may have a focal length of 6 mm, an aperture of f/2.0, a horizontal field of vision of 60.1 degrees, and a perception range of 350 meters. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 6 mm, an aperture of f/2.0, a horizontal field of vision of 60.1 degrees, and a perception range of 350 meters. The right-side facing camera and the left-side facing camera may have a focal length of 6 mm, an aperture of f/2.0, a horizontal field of vision of 60.1 degrees, and a perception range of 350 meters. In some embodiments, all of the cameras may be attached to the exterior of a roof rack or brackets of a vehicle. In at least one embodiment, the at least 3 forward facing cameras of the plurality of forward-facing cameras are mounted above a cabin of the tractor. The field of vision of any camera may overlap with other cameras. The field of vision of the cameras combined is near or at 360 degrees.

In other embodiments, the sensor layout may include at least five-forward facing cameras and two backward-facing cameras. Three of the forward-facing cameras may have a focal length of 4 mm, an aperture of f/2.0, a horizontal field of vision of 77.2 degrees, and a perception range of 250 meters. These cameras may be attached on the left side of a roof rack, on the middle of the roof rack, and on the right side of the roof rack. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 4 mm, an aperture of f/2.0, a horizontal field of vision of 77.2 degrees, and a perception range of 250 meters. All of the cameras may be attached to the exterior of a roof rack or brackets of a vehicle. The field of vision of one camera may overlap with other cameras.

In still other embodiments, the sensor layout may include at least five forward-facing cameras, two backward-facing cameras, and one right-side camera facing to the right side, and one left-side camera facing to the left side. Three of the forward-facing cameras have a focal length of 6 mm, an aperture of f/2.0, a horizontal field of vision of 60.1 degrees, and a perception range of 250 meters. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 6 mm, an aperture of f/2.0, a horizontal field of vision of 60.1 degrees, and a perception range of 250 meters. The right-side facing camera and the left-side facing camera may have a focal length of 6 mm, an aperture of f/2.0, a horizontal field of vision of 60.1 degrees, and a perception range of 250 meters. All of the cameras may be attached to the exterior of a roof rack or brackets of a vehicle. The field of vision of one camera may overlap with other cameras. The field of vision of the cameras combined is near or at 360 degrees.

The vehicle 105 may include a Light Detection and Ranging (LiDAR) unit. The LiDAR 220 is configured to use an infrared laser beam to determine the distance between the sensor and a nearby object. The LiDAR 220 may be configured to detect objects, road conditions, and other information relevant to the trajectory of the vehicle. The LiDAR 220 may be coupled to the vehicle using nails, screws, tapes, adhesives, welding, soldering, bolts, or similar materials. In some embodiments, the LiDAR 220 may be coupled to a rack along the top or bottom of the tractor. The LiDAR 220 may be coupled to the sides or the front of the truck. The LiDAR 220 may be coupled on top of or to the side of the engine compartment of the truck. The LiDAR 220 may be attached to the front grill, fenders, or mirrors of the truck. The LiDAR 220 may be coupled to a bracket extending from a head of a tractor. The LiDAR 220 may be coupled to any exterior portion of the cabin. The LiDAR 220 be coupled to a rack along the top, sides, or bottom of the semi-trailer. The LiDAR 220 may be coupled to a rack on a side of the truck head. In some embodiments, a set of LiDARs are used. The set of LiDARs increases the field of vision of the vehicle 105, the truck, and/or the semi-trailer.

The set of LiDARS may be configured to provide a field of vision of the vehicle 105, the truck and/or the semi-trailer with a perception range of at or near 360 degrees. The set of LiDARs may be configured to measure a distance between the tractor and an object. Additional LiDARS may be added to achieve a range of vision at or near 360 degrees around the vehicle. In some implementations, additional LiDARs are added to achieve a range of vision at or near 360 degrees around the tractor and the semi-trailer.

In some embodiments, a semi-trailer LiDAR may be configured to monitor the position of the trailer as a feedback loop for truck control. A semi-trailer LiDAR may be configured to monitor an angle of the semi-trailer relative to the tractor. The data received from the LiDAR 220 can be used to calculate the angle between the semi-trailer and the tractor. In response, the tractor may adjust its turning angle to increase or decrease the angle between the semi-trailer and the tractor. In some scenarios, the angle between the tractor and the semi-trailer decreased based on the data received from the LiDAR 220.

The vehicle 105 may include a Radio Detection and Ranging (RADAR) unit. The RADAR 230 is configured to detect an object near the vehicle. RADAR 230 may also be configured to determine the range, angle, or velocity of objects near the vehicle 105. The RADAR 230 may be configured to detect objects, road conditions, and other information relevant to the trajectory of the vehicle 105. The RADAR 230 may be integrated into trucks, tractors, and semi-trailers for different purposes like adaptive cruise control, blind spot warning collision warning and collision avoidance. The RADAR 230 may be coupled to the vehicle 105 using nails, screws, tapes, adhesives, welding, soldering, bolts, or similar materials. In some embodiments, the RADAR 230 may be coupled to a rack along the top or bottom of the tractor. The RADAR 230 may be coupled to the sides or the front of the truck. The RADAR 230 may be coupled on top of or to the side of the engine compartment of the truck. The RADAR 230 may be attached to the front grill, fenders, or mirrors of the truck. The RADAR 230 may be coupled to any exterior portion of the cabin. The RADAR 230 be coupled to a rack along the top, sides, or bottom of the semi-trailer. The RADAR 230 may be coupled to a rack on the side of the truck head. In some embodiments, a plurality of RADARs is used. The plurality of RADARs increases the field of vision of the vehicle 105, the truck, and/or the semi-trailer. The plurality of RADARs may be configured to provide a field of vision of the vehicle 105, the truck and/or the semi-trailer with a perception range at or near 360 degrees.

The vehicle 105 may include a plurality of RADAR coupled to the vehicle 105. A subset of the plurality of RADAR may be oriented in different directions. The vehicle 105 may include at least one RADAR of the plurality of RADARs that faces outward from the front of the vehicle 105. The forward-facing RADAR may be coupled near the front of the vehicle 105 and faces outwards from the front of the vehicle 105. In at least one implementation, the forward-facing RADAR may be positioned toward the front of the vehicle 105, semi-trailer, or tractor. The forward-facing RADAR may be attached to a roof rack along the top side of the vehicle 105, semi-trailer, or tractor. The forward-facing RADAR may be arranged along the edge of the top of the vehicle 105, tractor, semi-trailer.

In at least one embodiment, the vehicle 105 may include at least one RADAR of the plurality of RADARs that faces outwards from the back of the vehicle 105. The backward-facing RADAR may be coupled near the back of the vehicle 105 and facing outwards from the back of the vehicle 105. The backward-facing RADAR may be positioned towards the back of the vehicle 105, semi-trailer, or tractor. The backward-facing RADAR may be attached to a roof rack along the top side of the vehicle 105, semi-trailer, or tractor. The backward-facing RADAR may be arranged along the edge of the top of the vehicle 105, tractor, or semi-trailer.

The vehicle 105 may include one RADAR of the plurality of RADARs coupled to the right side of the vehicle 105 that faces outwards from the right of the vehicle 105. The vehicle 105 may include one RADAR of the plurality of RADARs coupled to the right side of the vehicle 105 that faces outwards from the left of the vehicle 105. In some embodiments, a right-side RADAR may be coupled to a right side of one of the tractor or the semi-trailer, the right-side camera facing outwards from the right of one of the tractor or the semi-trailer. In some embodiments, a left-side RADAR may be coupled to a left side of one of the tractor or the semi-trailer, the left-side RADAR facing outwards from the left of one of the tractor or the semi-trailer.

The left-side RADAR and the right-side RADAR may be considered side-facing RADARs. The side-facing RADARs may be positioned towards the side of the vehicle 105, the tractor, or semi-trailer. In at least one implementation, the side-facing RADARs may be positioned toward the side of the semi-trailer, tractor, or vehicle 105. The side-facing RADARs may be attached to a roof rack along the top side of the semi-trailer or tractor. The side-facing RADARs may be arranged along the edge of the top of the vehicle 105, tractor, or semi-trailer.

The plurality of RADARs is configured to have a range of vision at or near 360 degrees around the vehicle 105. In one implementation, the combination of the at least one forward-facing RADAR, the at least one right-side RADAR, and the at least one left-side RADAR are configured to have a range of vision at or near 360 degrees around the vehicle 105. In some implementations, the at least one forward-facing RADAR, the right-side RADAR, and the left-side RADAR are configured to have a range of vision at or near 360 degrees around the tractor and the semi-trailer.

The RADAR may be a long-range microwave RADAR. The long-range RADAR may be coupled to the vehicle 105 at the middle or front of the tractor head. The long-range RADAR may be attached to the vehicle, tractor, or semi-trailer and may face outward from the front of the vehicle, tractor, or semi-trailer. The long-range RADAR may be configured to detect an object near the tractor. The long-range RADAR may operate at a frequency greater than 40 GHz. In at least one implementation, the long-range RADAR operates at 77 GHz which can measure speed and detect vehicles and obstacles at 250 meters away.

The RADAR may be a short/medium-range RADAR. The short/medium-range RADAR can detect velocity and distance, but the broader beams and longer wavelengths of short/medium-range RADAR limit its resolution and potentially causes complex return signals. Short/medium-range RADAR may be coupled to the vehicle 105, the tractor, or the semi-trailer. The short/medium range RADAR may be configured to measure velocity and distance of an object near the vehicle. The short/medium-range RADAR may be configured to detect an object near the tractor. A plurality of short/medium range RADAR may be configured to measure velocity and distance of an object near the tractor. The short/medium-range RADAR may operate at a frequency between 2 and 36 GHz. In at least one implementation, the short/medium-range RADAR operates at 24 GHz which can measure speed and detect vehicles and obstacles 75 meters away. The plurality of short-range RADARs is configured to have a range of vision at or near 360 degrees around the vehicle 105, the tractor, and/or the semi-trailer. In some embodiments, additional short/medium-range RADARs are added around the vehicle 105, semi-trailer, or tractor, increasing the radius of the RADAR system. A plurality of short-range RADARs is configured to have a range of vision at or near 360 degrees around the tractor.

The vehicle 105 may include a Global Positioning System (GPS) transceiver. The GPS transceiver 240 is configured to provide longitude, latitude, and heading angle information. The GPS transceiver 240 is configured to provide localization data and pose estimation data. GPS may be configured to provide longitude, latitude, altitude, row, pitch, yaw, and heading angle information. The GPS transceiver 240 may be configured to estimate a geographic location of the vehicle 105. The GPS transceiver 240 may include a receiver/transmitter operable to provide information regarding the position of the vehicle 105 with respect to the Earth. The GPS transceiver 240 may be coupled to the bottom or the rear floor of the cabin of the truck. A plurality of GPS transceivers may be used for additional accuracy and boosted signal reception.

The vehicle 105 may include an inertial measurement unit (IMU). The IMU 250 may include any combination of sensors (e.g., accelerometers and gyroscopes) configured to sense position and orientation changes of the vehicle 105 based on inertial acceleration. The IMU may be coupled to the tractor, the semi-trailer, or the vehicle 105. The IMU may be configured to report the status, solution type, and error of the measurements. The IMU may be configured to provide dead reckoning. The IMU may be configured to accurately locate the truck for a period of time during a signal outage.

The vehicle 105 may include global mobile satellite system (GMSS). The GMSS 260 may be coupled to the tractor. GMSS 260 is configured to receive signals from an artificial body orbiting the earth. GMSS 260 provides a variety of communications services, including voice and data.

Figure 3:
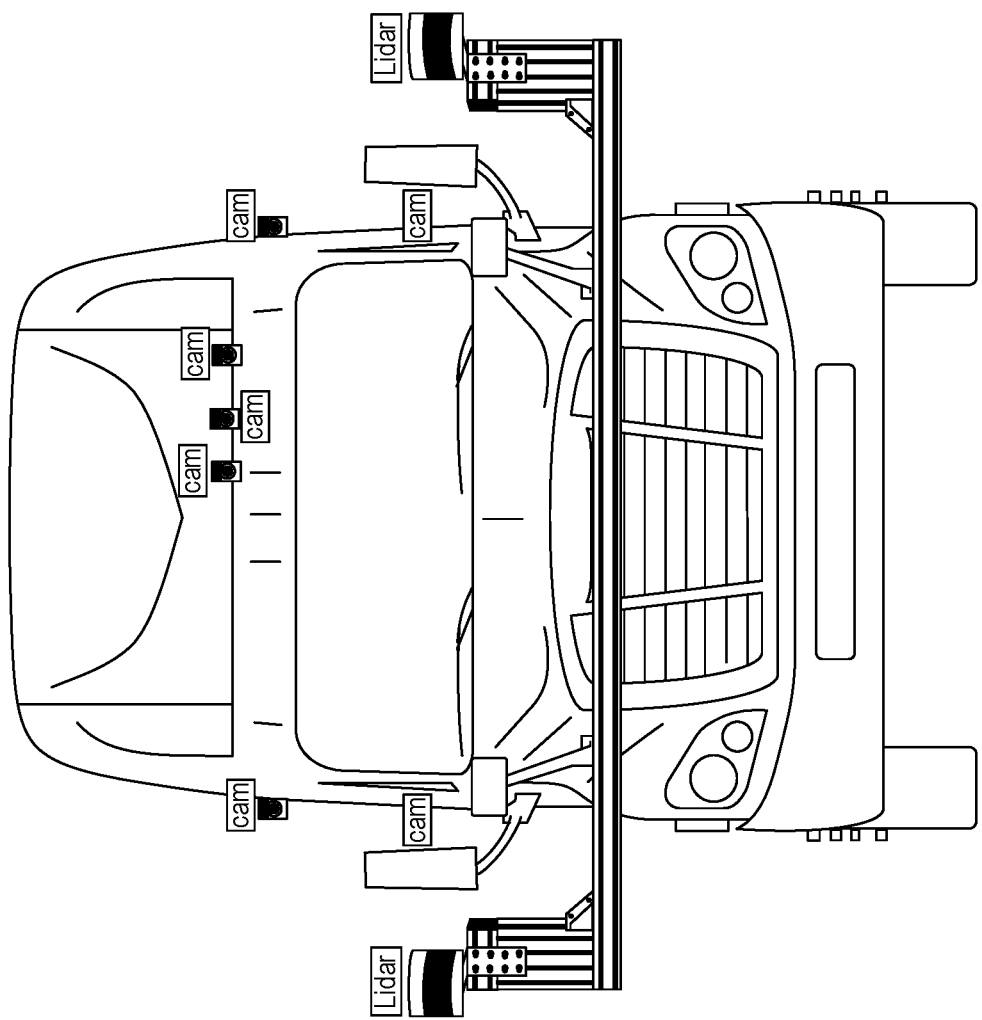
FIG. 3 shows an exemplary sensor layout on a trailer truck of an exemplary embodiment.

FIG. 3 shows an exemplary sensor layout on a trailer truck of an exemplary embodiment. The exemplary sensor layout includes a layout of a plurality of forward-facing cameras, a right-side camera, a left-side camera, and a set of LiDARs.

The exemplary sensor layout may include at least five-forward facing cameras and two backward-facing cameras. Three of the forward-facing cameras may have a focal length of 4 mm, an aperture of f/2.0, a horizontal field of vision of 77.2 degrees, and a perception range of 250 meters. These cameras may be attached on the left side of the exterior of the cabin, on the middle of the roof rack, and on the right side of the exterior of the cabin. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 4 mm, an aperture of f/2.0, a horizontal field of vision of 77.2 degrees, and a perception range of 250 meters. All of the cameras may be attached to the exterior of a roof rack or brackets of a vehicle. The field of vision of one camera may overlap with other cameras.

The set of LiDARS may be configured to provide a field of vision of the vehicle 105, the truck and/or the semi-trailer with a perception range of at or near 360 degrees. The set of LiDARs may be configured to measure a distance between the tractor and an object. Here, the set of LiDARS is coupled to a bracket on the front of the truck head. Additional LiDARS may be added to achieve a range of vision at or near 360 degrees around the vehicle. In some implementations, additional LiDARs are added to achieve a range of vision at or near 360 degrees around the tractor and the semi-trailer.

Figure 4:
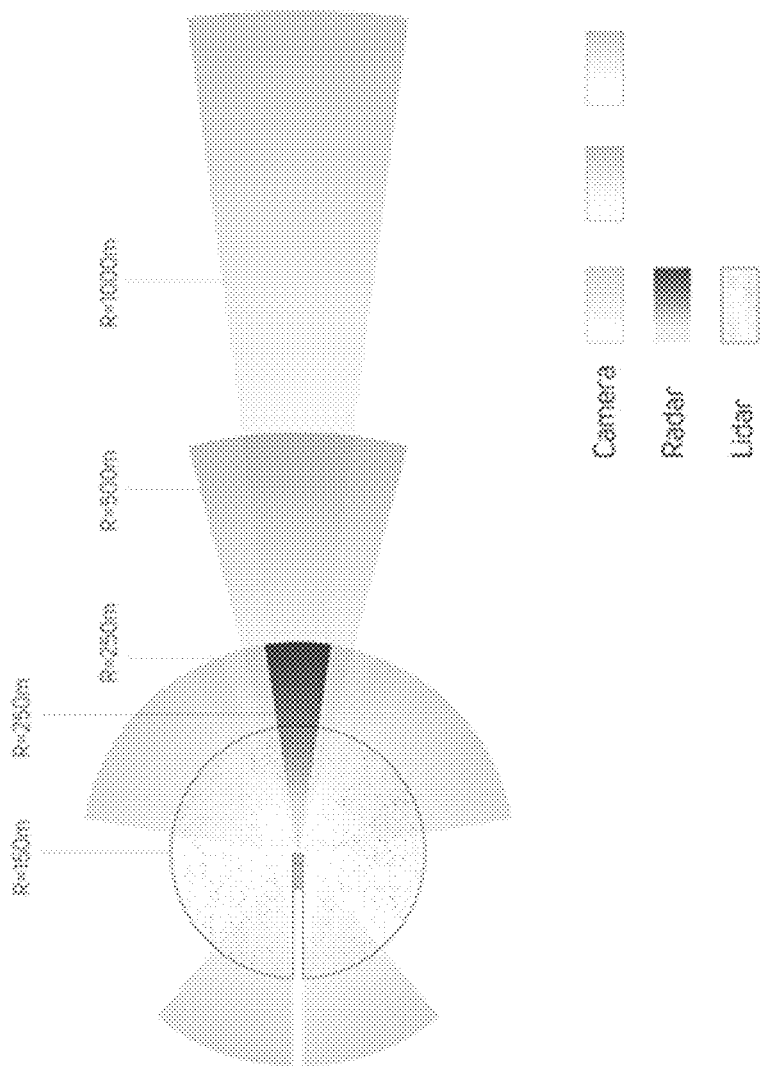
FIG. 4 shows an exemplary sensor perception of an optimized sensor layout of an exemplary embodiment.

FIG. 4 shows an exemplary sensor perception of an optimized sensor layout of an exemplary embodiment. This exemplary sensor perception may be the result of at least five-forward facing cameras, two backward-facing cameras, and a set of LiDARs, and a long-range RADAR detector.

The exemplary sensor perception may be the results of at least five-forward facing cameras, and two backward-facing cameras. Three of the forward-facing cameras may have a focal length of 4 mm, an aperture of f/2.0, a horizontal field of vision of 77.2 degrees, and a perception range of 250 meters. These cameras may be attached on the left side of a roof rack, on the middle of the roof rack, and on the right side of the roof rack. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 4 mm, an aperture of f/2.0, a horizontal field of vision of 77.2 degrees, and a perception range of 250 meters. All of the cameras may be attached to the exterior of a roof rack or brackets of a vehicle. The field of vision of one camera may overlap with other cameras.

The set of LiDARS may be configured to provide a field of vision of the vehicle 105, the truck and/or the semi-trailer with a perception range of at or near 360 degrees. The set of LiDARs may be configured to measure a distance between the tractor and an object. Additional LiDARS may be added to achieve a range of vision at or near 360 degrees around the vehicle. In some implementations, additional LiDARs are added to achieve a range of vision at or near 360 degrees around the tractor and the semi-trailer.

The RADAR may be a long-range microwave RADAR. The long-range RADAR may be coupled to the vehicle 105 at the middle or front of the tractor head. The long-range RADAR may be attached to the vehicle, tractor, or semi-trailer and may face outward from the front of the vehicle, tractor, or semi-trailer. The long-range RADAR may be configured to detect an object near the tractor. The long-range RADAR may operate at a frequency greater than 40 GHz. In at least one implementation, the long-range RADAR operates at 77 GHz which can measure speed and detect vehicles and obstacles at 250 meters away.

Figure 5:
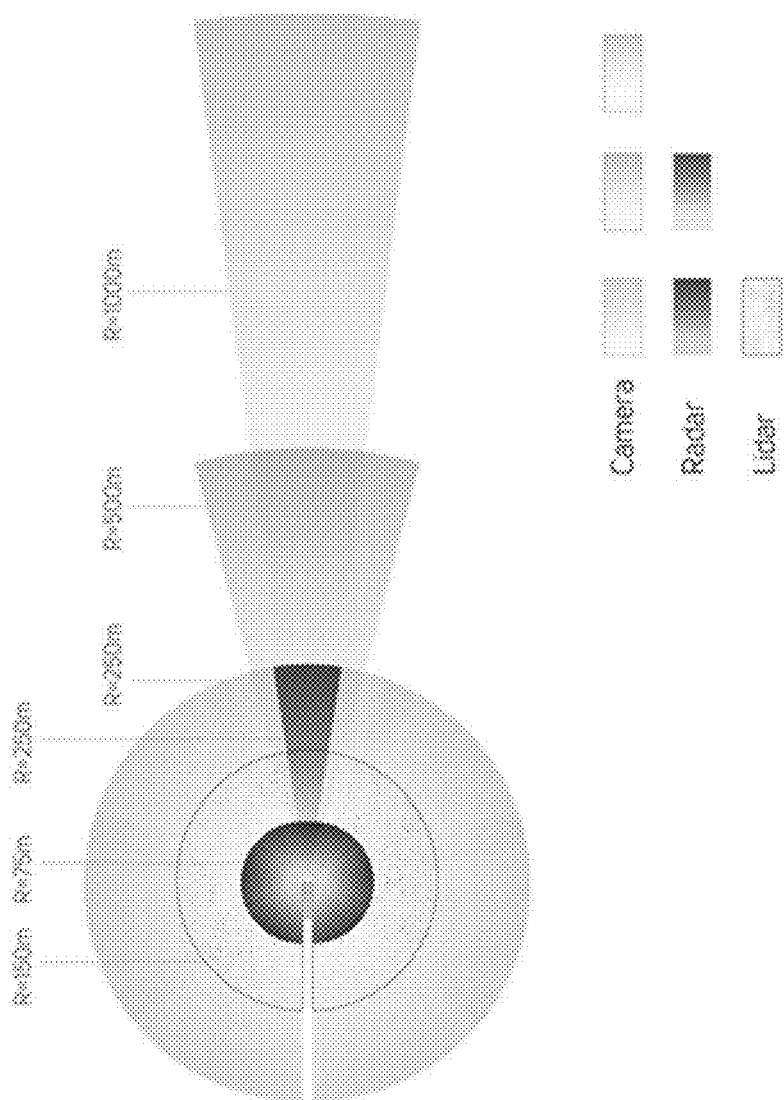
FIG. 5 shows an exemplary sensor perception of an optimized sensor layout of an exemplary embodiment.

FIG. 5 shows an exemplary sensor perception of an optimized sensor layout of an exemplary embodiment. This exemplary sensor perception may be the result of at least five-forward facing cameras, two backward-facing cameras, and a set of LiDARs, and a long-range RADAR detector, and a plurality of short/medium range RADAR.

The sensor layout may include at least five forward-facing cameras, two backward-facing cameras, and one right-side camera facing to the right side, and one left-side camera facing to the left side. Three of the forward-facing cameras have a focal length of 6 mm, an aperture of f/2.0, a horizontal field of vision of 60.1 degrees, and a perception range of 250 meters. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 6 mm, an aperture of f/2.0, a horizontal field of vision of 60.1 degrees, and a perception range of 250 meters. The right-side facing camera and the left-side facing camera may have a focal length of 6 mm, an aperture of f/2.0, a horizontal field of vision of 60.1 degrees, and a perception range of 250 meters. All of the cameras may be attached to the exterior of a roof rack or brackets of a vehicle. The field of vision of one camera may overlap with other cameras. The field of vision of the cameras combined is near or at 360 degrees.

The set of LiDARS may be configured to provide a field of vision of the vehicle 105, the truck and/or the semi-trailer with a perception range of at or near 360 degrees. The set of LiDARs may be configured to measure a distance between the tractor and an object. Additional LiDARS may be added to achieve a range of vision at or near 360 degrees around the vehicle. In some implementations, additional LiDARs are added to achieve a range of vision at or near 360 degrees around the tractor and the semi-trailer.

The RADAR may be a long-range microwave RADAR. The long-range RADAR may be coupled to the vehicle 105 at the middle or front of the tractor head. The long-range RADAR may be attached to the vehicle, tractor, or semi-trailer and may face outward from the front of the vehicle, tractor, or semi-trailer. The long-range RADAR may be configured to detect an object near the tractor. The long-range RADAR may operate at a frequency greater than 40 GHz. In at least one implementation, the long-range RADAR operates at 77 GHz which can measure speed and detect vehicles and obstacles at 250 meters away.

The RADAR may be a short/medium-range RADAR. The short/medium-range RADAR can detect velocity and distance, but the broader beams and longer wavelengths of short/medium-range RADAR limit its resolution and potentially causes complex return signals. Short/medium-range RADAR may be coupled to the vehicle 105, the tractor, or the semi-trailer. The short/medium range RADAR may be configured to measure the velocity and distance of an object near the vehicle. The short/medium-range RADAR may be configured to detect an object near the tractor. A plurality of short/medium range RADAR is configured to measure the velocity and distance of an object near the tractor. The short/medium-range RADAR may operate at a frequency between 2 and 36 GHz. In at least one implementation, the short/medium-range RADAR operates at 24 GHz which can measure speed and detect vehicles and obstacles 75 meters away. The plurality of short-range RADARs is configured to have a range of vision at or near 360 degrees around the vehicle 105, the tractor, and/or the semi-trailer. In some embodiments, additional short/medium-range RADARs are added around the vehicle 105, semi-trailer, or tractor, increasing the radius of the RADAR system. A plurality of short-range RADARs is configured to have a range of vision at or near 360 degrees around the tractor.

Figure 6:
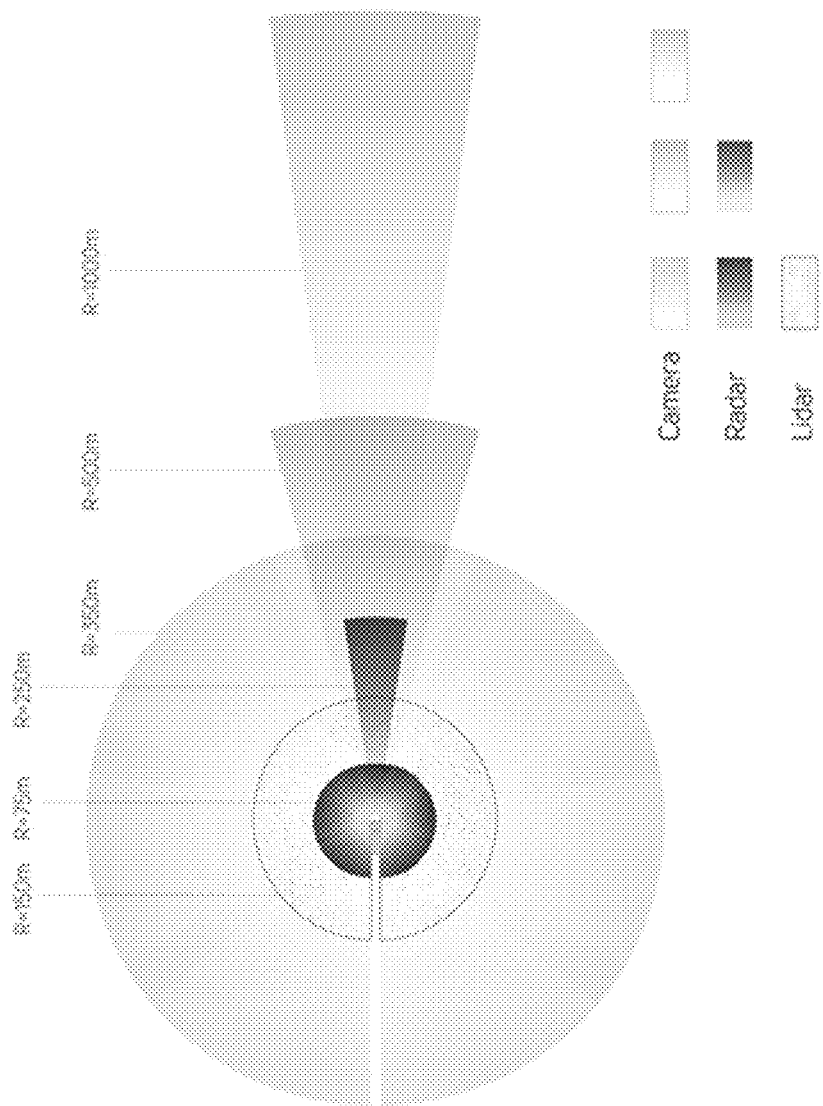
FIG. 6 shows an exemplary sensor perception of an optimized sensor layout of an exemplary embodiment.

FIG. 6 shows an exemplary sensor perception of an optimized sensor layout of an exemplary embodiment. This exemplary sensor perception may be the result of at least five-forward facing cameras, two backward-facing cameras, and a set of LiDARs, and a long-range RADAR detector, and a plurality of short/medium range RADAR.

The sensor layout may include at least five forward-facing cameras, two backward-facing cameras, and one right-side camera facing to the right side, and one left-side camera facing to the left side according to some embodiments. Three of the forward-facing cameras may have a focal length of 6 mm, an aperture of f/2.0, a horizontal field of vision of 60.1 degrees, and a perception range of 350 meters. One of the forward-facing cameras has a focal length of 12 mm, an aperture of f/2.0, a horizontal field of vision of 32.8 degrees, a perception range of 500 meters, and may be positioned in the middle of the roof rack of the vehicle 105, semi-trailer, or truck. Another forward-facing camera has a focal length of 25 mm, an aperture of f/2.8, a horizontal field of vision of 15.4 degrees, a perception range of 1000 meters, and may be positioned in the middle of the roof rack of the vehicle 105, semi-trailer, or truck. The two backward facing cameras may have a focal length of 6 mm, an aperture of f/2.0, a horizontal field of vision of 60.1 degrees, and a perception range of 350 meters. The right-side facing camera and the left-side facing camera may have a focal length of 6 mm, an aperture of f/2.0, a horizontal field of vision of 60.1 degrees, and a perception range of 350 meters. In some embodiments, all of the cameras may be attached to the exterior of a roof rack or brackets of a vehicle. In at least one embodiment, the at least 3 forward facing cameras of the plurality of forward-facing cameras are mounted above a cabin of the tractor. The field of vision of any camera may overlap with other cameras. In some embodiments, the field of vision of the cameras combined is near or at 360 degrees. In some embodiments, a 12 mm lens may be used for the backward-facing camera.

The RADAR may be a long-range microwave RADAR. The long-range RADAR may be coupled to the vehicle 105 at the middle or front of the tractor head. The long-range RADAR may be attached to the vehicle, tractor, or semi-trailer and may face outward from the front of the vehicle, tractor, or semi-trailer. The long-range RADAR may be configured to detect an object near the tractor. The long-range RADAR may operate at a frequency greater than 40 GHz. In at least one implementation, the long-range RADAR operates at 77 GHz which can measure speed and detect vehicles and obstacles at 250 meters away.

The RADAR may be a short/medium-range RADAR. The short/medium-range RADAR can detect velocity and distance, but the broader beams and longer wavelengths of short/medium-range RADAR limit its resolution and potentially causes complex return signals. Short/medium-range RADAR may be coupled to the vehicle 105, the tractor, or the semi-trailer. The short/medium range RADAR may be configured to measure the velocity and distance of an object near the vehicle. The short/medium-range RADAR may be configured to detect an object near the tractor. A plurality of short/medium range RADAR is configured to measure the velocity and distance of an object near the tractor. The short/medium-range RADAR may operate at a frequency between 2 and 36 GHz. In at least one implementation, the short/medium-range RADAR operates at 24 GHz which can measure speed and detect vehicles and obstacles 75 meters away. The plurality of short-range RADARs is configured to have a range of vision at or near 360 degrees around the vehicle 105, the tractor, and/or the semi-trailer. In some embodiments, additional short/medium-range RADARs are added around the vehicle 105, semi-trailer, or tractor, increasing the radius of the RADAR system. A plurality of short-range RADARs is configured to have a range of vision at or near 360 degrees around the tractor.

Figure 7:
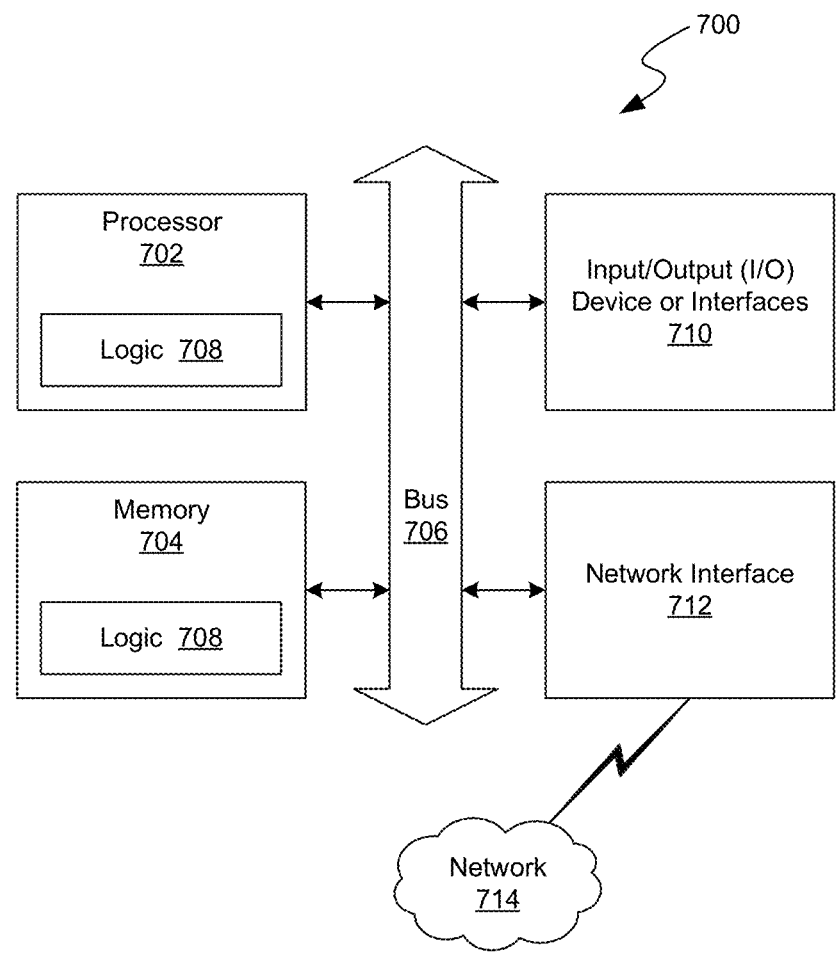
FIG. 7 shows a diagrammatic representation of machine in the example form of a computer system within which a set of instructions when executed may cause the machine to perform any one or more of the methodologies discussed herein.

FIG. 7 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

What is claimed is:

1. A system comprising:
    a vehicle capable of semi-autonomous or autonomous operation;
    a plurality of forward-facing cameras coupled to the vehicle and configured to have a field of view in front of the vehicle;
    at least two backward-facing cameras coupled to the vehicle and configured to have a field of view behind the vehicle,
    wherein the at least two backward-facing cameras have a focal length that is same as a focal length of one of the plurality of forward-facing cameras.

2. The system of claim 1, further comprising:
    a right-side camera coupled to a right side of the vehicle, the right-side camera configured to have a field of view to a right of the vehicle; and
    a left-side camera coupled to a left side of the vehicle, the left-side camera configured to have a field of view to a left of the vehicle.

3. The system of claim 1, wherein the plurality of forward-facing cameras includes at least three forward-facing cameras having different focal lengths from one another.

4. The system of claim 1, wherein a first forward-facing camera of the plurality of forward-facing cameras has a focal length of 15 mm or less, a second forward-facing camera of the plurality of forward-facing cameras has a focal length of 8-36 mm, and a third forward-facing camera of the plurality of forward-facing cameras has a focal length of at least 25 mm.

5. The system of claim 1, wherein the backward-facing camera includes a camera having a focal length of 12 mm.

6. The system of claim 1, further comprising:
    a set of LiDARs (light detection and rangings) coupled to the vehicle, the set of LiDARs configured to measure a distance between the vehicle and an object.

7. The system of claim 1, further comprising:
    a RADAR (radio detection and ranging) coupled to the vehicle and configured to detect an object near the vehicle and/or measure a velocity and a distance of the object.

8. The system of claim 7, wherein the RADAR operates at a frequency greater than 40 GHz.

9. The system of claim 7, wherein the RADAR is configured to have a range of vision at or near 360 degrees around the vehicle.

10. A system comprising:
    a tractor capable of semi-autonomous or autonomous operation, the tractor coupled to a semi-trailer;
    at least three forward-facing cameras coupled to the tractor or the semi-trailer and configured to have a field of view in front of one of the tractor or the semi-trailer, the at least three forward-facing cameras having different perception ranges from one another;
    at least two backward-facing cameras coupled to one of the tractor or the semi-trailer and configured to have a field of view behind the tractor or the semi-trailer, the at least two backward-facing cameras having a perception range that is same as a perception range of one of the at least three forward-facing cameras.

11. The system of claim 10, wherein the at least three forward-facing cameras include a first forward-facing camera having a perception range of about 250 meters, a second forward-facing camera having a perception range of about 500 meters, and a third forward-facing camera having a perception range of about 1000 meters.

12. The system of claim 11, wherein the at least two backward-facing cameras having the perception range of about 250 meters.

13. The system of claim 10, further comprising:
    a LiDAR configured to monitor an angle of the semi-trailer relative to the tractor.

14. The system of claim 10, further comprising:
    a set of LiDARs coupled to the tractor, the set of LiDARs configured to measure a distance between the tractor and an object; and
    a long-range RADAR coupled to the tractor, the long-range RADAR being a microwave RADAR and configured to detect the object near the tractor.

15. The system of claim 14, wherein the set of LiDARs is configured to have a range of vision at or near 360 degrees around the tractor and the semi-trailer and the long-range RADAR operates at a frequency greater than 40 GHz.

16. The system of claim 10, further comprising:
    a GPS (global positioning system) transceiver coupled to the tractor, the GPS transceiver configured to provide longitude, latitude, and heading angle information; and
    an IMU (inertial measurement unit) coupled to the tractor, the IMU configured to sense position and orientation changes of the tractor based on inertial acceleration.

17. The system of claim 16, wherein the GPS transceiver is further configured to provide localization data and pose estimation data and the IMU is further configured to assist in accurately locating the tractor for a period of time during a signal outage.

18. The system of claim 10, further comprising:
    a plurality of short/medium-range RADAR coupled to one of the tractor or the semi-trailer, the plurality of short/medium-range RADAR configured to measure velocity and distance of an object near the tractor and configured to operate at a frequency between 2 and 36 GHz.

19. The system of claim 18, wherein the plurality of short/medium-range RADAR is configured to have a range of vision at or near 360 degrees around the tractor.

20. The system of claim 10, further comprising:
a global mobile satellite system (GMSS) coupled to the tractor.

* * * * *